US012691765B2

(12) United States Patent
Seto

(10) Patent No.: US 12,691,765 B2
(45) Date of Patent: Jul. 28, 2026

(54) DRIVE DEVICE TO SUPPRESS TEMPERATURE DIFFERENCE BETWEEN MOTORS WHILE CHARGING BATTERY

(71) Applicant: TOYOTA JIDOSHA KABUSHIKI KAISHA, Toyota (JP)

(72) Inventor: Junichi Seto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 18/778,324

(22) Filed: Jul. 19, 2024

(65) Prior Publication Data

US 2024/0375523 A1 Nov. 14, 2024

(30) Foreign Application Priority Data

Aug. 23, 2023 (JP) ................................. 2023-135612
Mar. 11, 2024 (JP) ................................. 2024-037453

(51) Int. Cl.
 *B60L 15/20* (2006.01)
 *B60L 15/00* (2006.01)
 *B60L 58/12* (2019.01)
(52) U.S. Cl.
 CPC ............. *B60L 15/20* (2013.01); *B60L 15/007* (2013.01); *B60L 58/12* (2019.02); *B60L 2240/425* (2013.01)
(58) Field of Classification Search
 CPC ...... B60L 15/00; B60L 58/00; B60L 2240/00; B60L 2220/00; B60L 50/00
 See application file for complete search history.

(56) References Cited

U.S. PATENT DOCUMENTS

| | | | | |
|---|---|---|---|---|
| 2012/0200241 A1* | 8/2012 | Kojima | ................. | B60L 15/025 |
| | | | | 318/139 |
| 2017/0131158 A1* | 5/2017 | Matsubara | .............. | H02P 29/60 |
| 2020/0101858 A1* | 4/2020 | Kuroda | ................ | G07C 5/0825 |
| 2020/0361323 A1* | 11/2020 | Chon | ...................... | H02M 7/44 |
| 2022/0329184 A1* | 10/2022 | Lian | ........................ | B60L 58/10 |
| 2023/0223884 A1* | 7/2023 | Yoshizawa | ............ | B60L 15/007 |
| | | | | 318/139 |
| 2023/0421090 A1* | 12/2023 | Hair | ...................... | H02P 29/662 |
| 2024/0204712 A1* | 6/2024 | Penne | ...................... | H02P 29/68 |
| 2024/0351450 A1* | 10/2024 | Cunningham | ...... | B60L 15/2045 |
| 2025/0042306 A1* | 2/2025 | Xu | .......................... | B60L 58/25 |
| 2025/0167705 A1* | 5/2025 | Hashizume | ............. | H02P 29/62 |

FOREIGN PATENT DOCUMENTS

JP 2016-063587 A 4/2016

* cited by examiner

*Primary Examiner* — Aniss Chad
*Assistant Examiner* — Elizabeth J Slowik
(74) *Attorney, Agent, or Firm* — Oliff PLC

(57) ABSTRACT

An art configured to suppress a temperature difference between two drive motors while charging a battery is provided. A drive device for an electric vehicle having a battery may comprise a first motor and a second motor electrically connected to the battery and configured to drive at least one driving wheel of the electric vehicle, and a controller configured to respectively control a current that flows in the first motor and a current that flows in the second motor. The controller may be configured to execute supplying power from an external power supply to the battery via a neutral point of the first motor. The controller may be configured to execute causing a d-axis current to flow in the second motor during the supplying the power.

8 Claims, 6 Drawing Sheets

FIG. 2

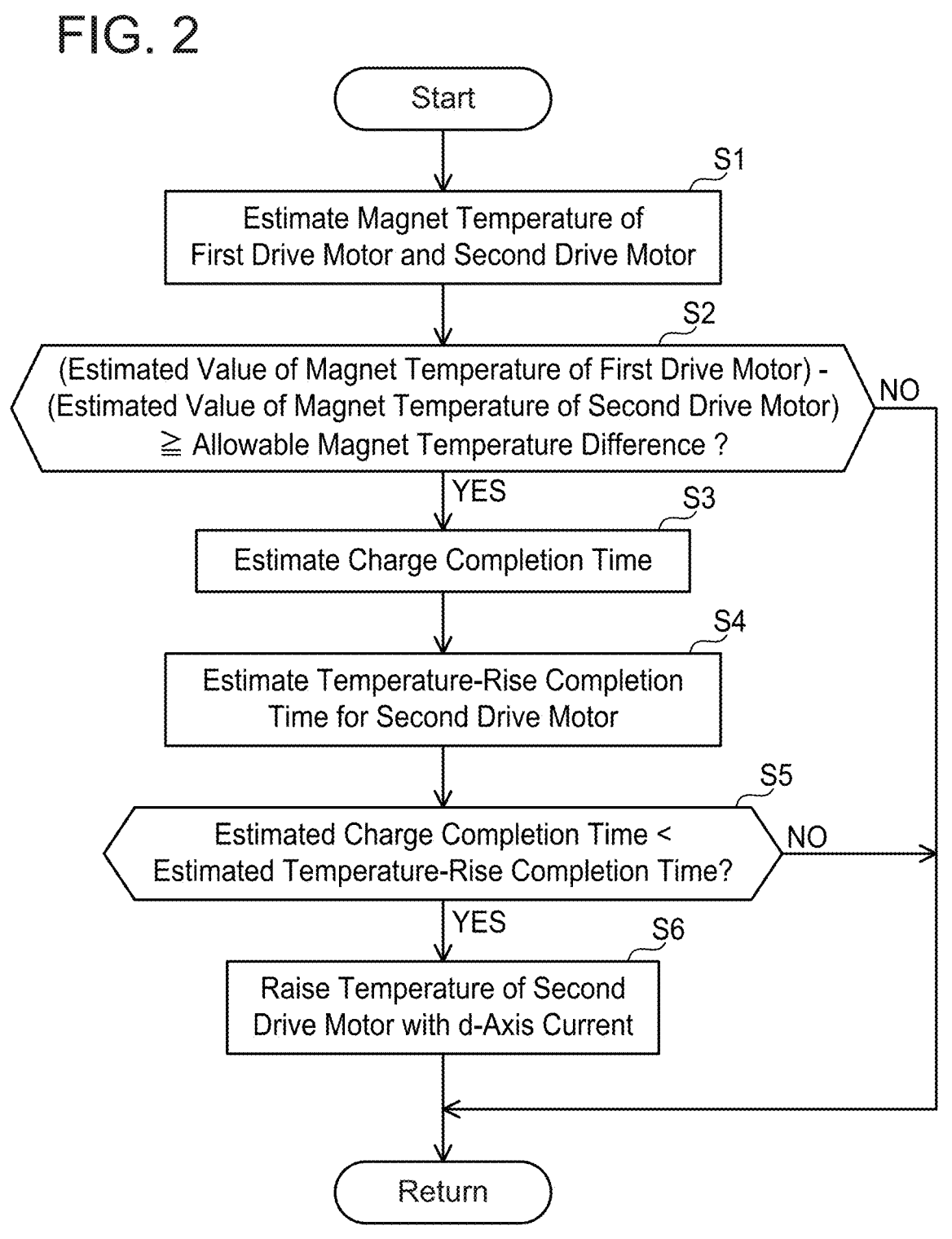

Start

S1

Estimate Magnet Temperature of
First Drive Motor and Second Drive Motor

S2

(Estimated Value of Magnet Temperature of First Drive Motor) -
(Estimated Value of Magnet Temperature of Second Drive Motor)
$\geqq$ Allowable Magnet Temperature Difference ?

NO

YES

S3

Estimate Charge Completion Time

S4

Estimate Temperature-Rise Completion
Time for Second Drive Motor

S5

Estimated Charge Completion Time <
Estimated Temperature-Rise Completion Time?

NO

YES

S6

Raise Temperature of Second
Drive Motor with d-Axis Current

Return

Pulled toward One Side

Torque Deviation

High Motor Temperature Caused by Charging

Low Motor Temperature

Torque Deviation

High Motor Temperature Caused by Charging

High Motor Temperature Caused by Warm-up

DRIVE DEVICE TO SUPPRESS TEMPERATURE DIFFERENCE BETWEEN MOTORS WHILE CHARGING BATTERY

REFERENCE TO RELATED APPLICATIONS

This application claims priority from Japanese Patent Application No. 2023-135612 filed on Aug. 23, 2023 and Japanese Patent Application No. 2024-037453 filed on Mar. 11, 2024. The entire content of the priority applications is incorporated herein by reference.

BACKGROUND ART

The art disclosed herein relates to a drive device for an electric vehicle.

JP 2016-63587 A describes an electric vehicle having two drive motors for driving at least one driving wheel of the electric vehicle. As described in JP 2016-63587 A, in such an electric vehicle, when a temperature difference between the two drive motors becomes large, there is a problem that torque outputted from the two drive motors becomes unbalanced and thus traction stability decreases.

SUMMARY

An electric vehicle configured capable of charging a battery through one of two drive motors is in development. In such an electric vehicle, a difference in temperature between the drive motor used for charging and the drive motor that is not used for charging becomes large while charging the battery. Due to this, there is a concern that if the electric vehicle is driven after completing the charge, its traction stability may be decreased. The description herein provides an art configured to suppress a temperature difference between two drive motors while charging a battery.

The technique disclosed herein is implemented as a drive device for an electric vehicle equipped with a battery. The drive device may comprise a first motor and a second motor electrically connected to the battery and configured to drive at least one driving wheel of the electric vehicle. The drive device may comprise a controller configured to respectively control a current that flows in the first motor and a current that flows in the second motor. The controller may be configured to execute supplying power from an external power supply to the battery via a neutral point of the first motor. The controller may be configured to execute causing a d-axis current to flow in the second motor during the supplying the power.

According to the above drive device, by causing the d-axis current to flow in the second motor, which is not used for charging, a temperature of the second motor not used for charging thereby rises, and a temperature difference between the first and second motors thereby becomes smaller.

BRIEF DESCRIPTION OF THE DRAWINGS

FIG. 2 is a flowchart of a warm-up process for a drive motor.

DETAILED DESCRIPTION

Figure 1:
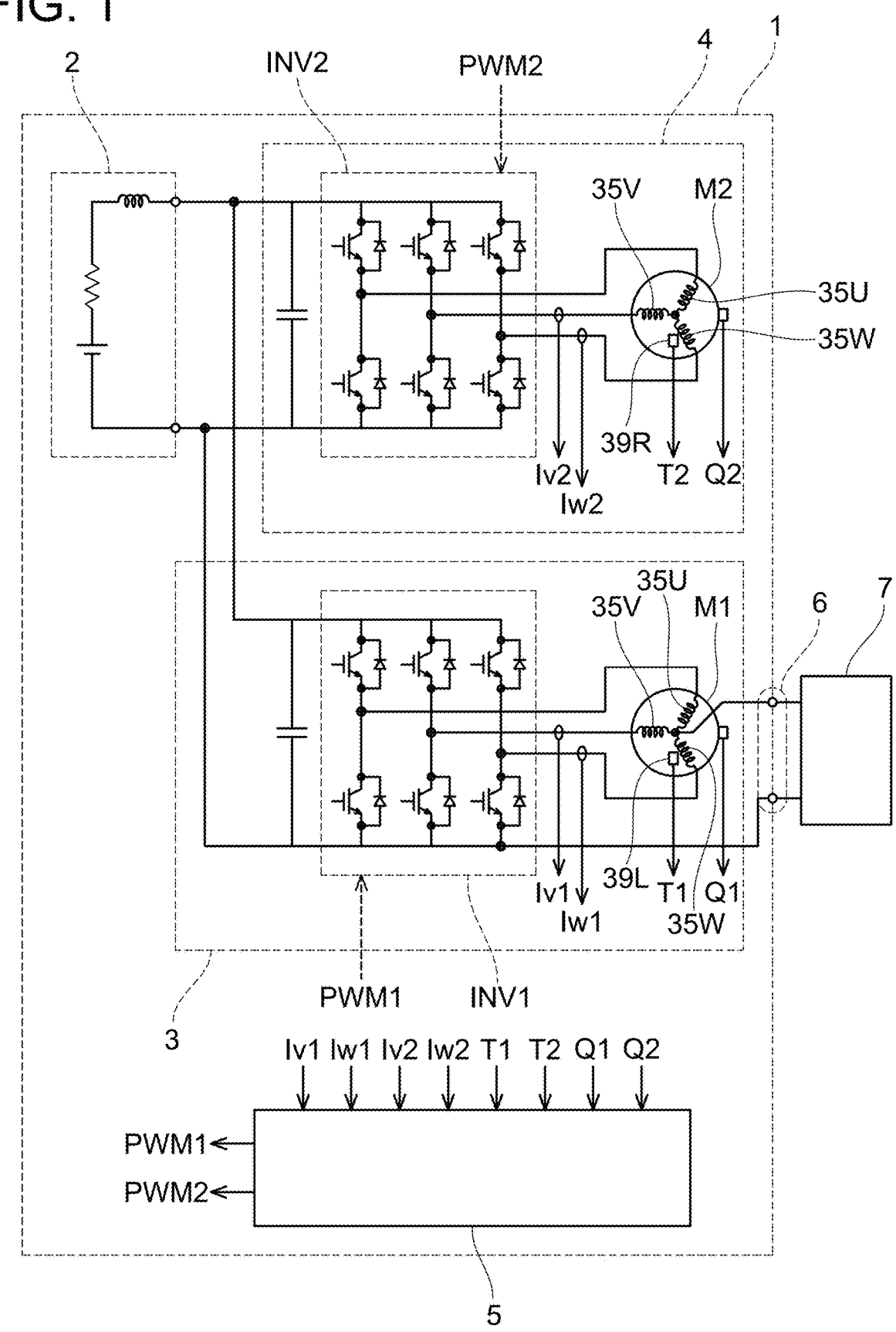
FIG. 1 is a block diagram of an electric vehicle.

In an embodiment of the technique disclosed herein, the controller may execute the causing the d-axis current to flow in the second motor during the supplying the power when a temperature difference between the first motor and the second motor is equal to or greater than a predetermined value.

According to this configuration, for example, when the temperature difference between the first and second motors is small, control may be executed so that the electrically energizing process is left unexecuted. Due to this, a temperature-raising process can efficiently be executed.

In some of the aforementioned embodiments, the temperature difference may be a difference between a magnet temperature of a rotor of the first motor and a magnet temperature of a rotor of the second motor.

Torque outputted by the first and second motors is dependent on magnet temperatures of the rotors. According to the above configuration, the temperature difference between the magnet temperature of the rotor of the first motor and the magnet temperature of the rotor of the second motor can be made small, thus a difference in the output torque can be made smaller.

In an embodiment of the technique disclosed herein, the controller may control a magnitude of the d-axis current that flows in the second motor in accordance with a temperature difference between the first motor and the second motor.

According to this configuration, for example, a conducted current can be made small when the temperature difference is small. The temperature-raising process can be executed with high energy efficiency.

In an embodiment of the technique disclosed herein, the controller may be further configured to execute estimating a required charging time required for completing to charge the battery in the supplying the power. The controller may be further configured to execute estimating a required temperature rising time required for a temperature difference between the first motor and the second motor to become equal to or less than a predetermined value in the causing the d-axis current to flow in the second motor. The controller may start the causing the d-axis current to flow in the second motor in response to the required charging time having decreased to the required temperature rising time or less.

According to this configuration, the required charging time and the required temperature rising time can be set to conform to each other. Thus, at the time of completing to charge, the temperature difference can be maintained equal to or less than a predetermined value.

In some of the aforementioned embodiments, the controller may be configured to execute monitoring the temperature difference during the supplying the power. The controller may be configured to execute the estimating the required charging time and the estimating the required temperature rising time when the temperature difference becomes equal to or greater than the predetermined value.

According to this configuration, for example, control can be executed so that the first and second estimation processes can be left unexecuted when the temperature difference between the first and second motors is small. Burden on the controller can thereby be reduced.

In an embodiment of the technique disclosed herein, the at least one driving wheel may comprise a left wheel and a right wheel of the electric vehicle. The first motor may drive one of the left wheel and the right wheel, and the second motor may drive the other of the left wheel and the right wheel.

In an embodiment of the technique disclosed herein, the at least one driving wheel may comprise a front wheel and a rear wheel of the electric vehicle. The first motor may drive one of the front wheel and the rear wheel, and the second motor may drive the other of the front wheel and the rear wheel.

In an embodiment of the technique disclosed herein, the drive device may further comprise an inverter circuit that comprises a plurality of switching elements and that is electrically connected between the battery and the first motor. The controller may control the plurality of switching elements during the supplying the power and causes the inverter circuit to cooperate with a plurality of coils of the first motor so as to function as a booster circuit.

According to this configuration, the battery can be charged using the first motor.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved drive devices.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

First Embodiment

As shown in FIG. 1, an electric vehicle 1 comprises a battery pack 2, a left drive unit 3, a right drive unit 4, a motor controller 5, and a charging inlet 6. The term "electric vehicle" as used herein includes battery electric vehicles (BEV), hybrid electric vehicles (HEV), plug-in hybrid electric vehicles (PHEV), fuel cell electric vehicles (FCEV), and the like.

The left drive unit 3 is provided corresponding to a left drive wheel of the electric vehicle 1, and comprises a first inverter INV1 and a first drive motor M1. The first inverter INV1 is a three-phase inverter circuit. In the first inverter INV1, a positive DC terminal is connected to a positive terminal of the battery pack 2, a negative DC terminal is connected to a negative terminal of the battery pack 2, and a midpoint of each phase arm is connected to the first drive motor M1. The first inverter INV1 is suitably controlled by a first control signal PWM1 outputted from the motor controller 5. The first drive motor M1 is a three-phase AC motor with three coils. One end of each of the three coils is connected to the midpoint of the corresponding phase arm of the first inverter INV1, and the other end of each of the three coils is connected at a neutral point of a start connection.

The left drive unit 3 comprises current sensors installed in each of cables for two phases (e.g., V phase and W phase) among cables extending from the first inverter INV1 to the first drive motor M1. These current sensors measure a current Iv1 flowing through the V-phase cable and a current Iw1 flowing through the W-phase cable, and output the measured currents Iv1 and Iw1 to the motor control unit 5. The left drive unit 3 further comprises a temperature sensor and a rotation angle sensor installed in the first drive motor M1. The temperature sensor outputs a measured motor temperature T1 to the motor controller 5. The rotation angle sensor measures a rotation angle Q1 of the first drive motor M1 (i.e., a rotation position of its rotor relative to its stator) and outputs the measured rotation angle Q1 to the motor controller 5.

The right drive section 4 is provided corresponding to a right drive wheel of the electric vehicle 1 and comprises a second inverter INV2 and a second drive motor M2. The configuration of the right drive unit 4 is substantially the same as that of the left drive unit 3, and its description is omitted.

The motor controller 5 is configured to generate the first control signal PWM1 to control the first inverter INV1 and a second control signal PWM2 to control the second inverter INV2. The motor controller 5 generates the control signals PWM1, PWM2 based on torque command values in a mode for driving the drive motors M1, M2. As will be explained below, in a mode for charging the battery pack 2, the motor controller 5 generates the control signals PWM1, PWM2 based on a d-axis current command value. A d-axis current and a q-axis current measured based on the currents Iv1, Iw1 and the rotation angle Q1 are used for feedback control when generating the control signals PWM1, PWM2.

The charging inlet 6 is arranged on a body of the electric vehicle 1. The charging inlet 6 is configured to be connected to an external DC power supply 7 (e.g., a charging station) via a power cable. The charging inlet 6 is provided for either the left drive unit 3 or the right drive unit 4, and in this example, it is provided corresponding to the left drive unit 3. One of a pair of terminals of the charging inlet 6 is connected to the neutral point of the first drive motor M1, and the other of the pair of terminals of the charging inlet 6 is connected to the negative terminal of the battery pack 2 via the first inverter INV1.

In a wiring configuration from the charging inlet 6 to the battery pack 2, a booster circuit is configured by a lower switching element and an upper diode that constitute one of the three phase arms of the first inverter INV1 and the coil of the first drive motor M1 that is connected to the midpoint of that phase arm. Similarly, each of the three phase arms constitutes a booster circuit. Thus, the first inverter INV1 and the first drive motor M1 can be regarded as three booster circuits connected in parallel between the charging inlet 6 and the battery pack 2. As above, by using the first inverter INV1 and the first drive motor M1 as booster circuits, the electric vehicle 1 can quickly charge the battery pack 2 even when an output voltage of the external DC power supply 7 is lower than that of the battery pack 2.

Referring to FIG. 2, s warm-up process executed by the motor controller 5 will be described below. When the power cable of the external DC power supply 7 is connected to the charging inlet 6 and a user turns on a charging switch (not shown), the process shown in FIG. 2 is executed. The motor controller 5 estimates a magnet temperature of the rotor of the first drive motor M1 from a motor temperature T1 measured by a first temperature sensor 39L installed in the first drive motor M1, and estimates a magnet temperature of the rotor of the second drive motor M2 from a motor temperature T2 measured by a second temperature sensor 39R installed in the second drive motor M2 (step S1). Estimation of the magnet temperatures is not particularly limited, however, it may be estimated using a predetermined function, for example, or a table describing a correspondence between the motor temperature and the magnet temperature.

Next, the motor controller 5 determines whether a difference between an estimated value of the magnet temperature of the first drive motor M1 and an estimated value of the magnet temperature of the second drive motor M2 is equal to or greater than an allowable magnet temperature difference (step S2). If a difference in the estimated values of the magnet temperature is smaller than the allowable magnet temperature difference, the process ends. The process then returns to step S1 and loop processing is performed. The loop processing may be performed in a predetermined cycle. Further, the loop processing may also be performed during a period in which the charging switch (not shown) is turned on. When the difference in the estimated values of the magnet temperature is greater than or equal to the allowable difference, the process proceeds to step S3.

Figure 3A:
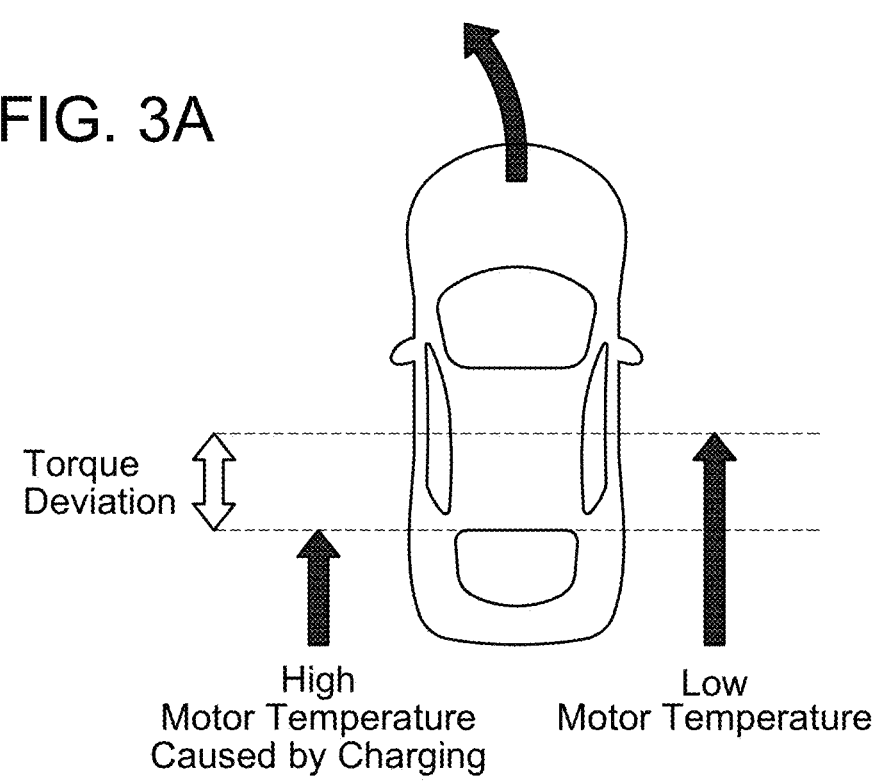
FIG. 3A explains how the electric vehicle moves straight ahead when a magnetic temperature difference between left and right drive motors is large.
Figure 3B:
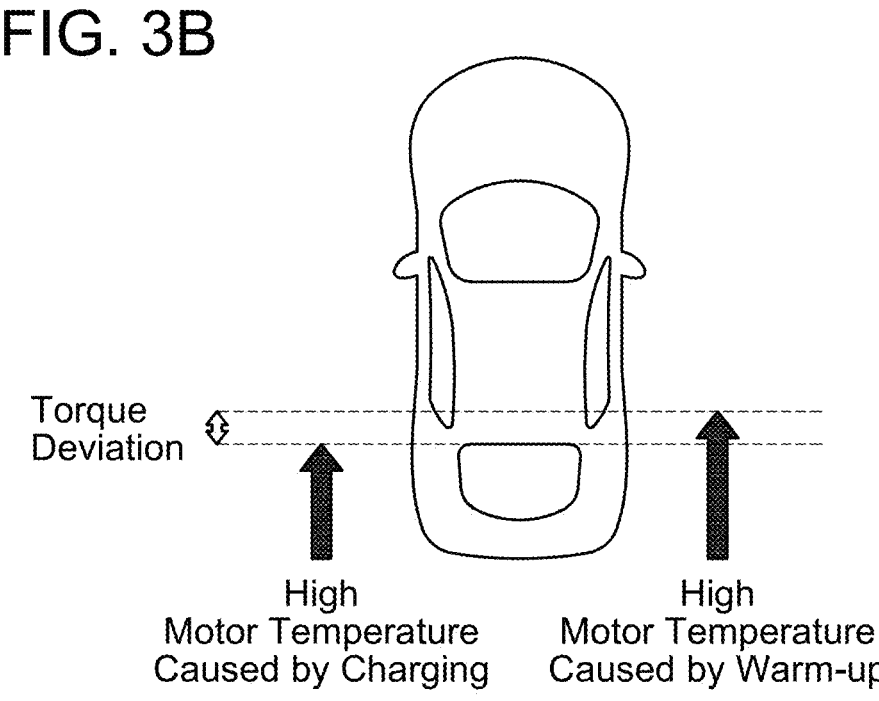
FIG. 3B explains how the electric vehicle moves straight ahead when the magnetic temperature difference between the left and right drive motors is small.

Here, torque outputted by the drive motors M1, M2 is dependent on the magnet temperatures of the drive motors M1, M2, and the torque becomes greater with low magnet temperatures. Since the first drive motor M1 is used for neutral point charging, the magnet temperature of the first drive motor M1 thereby rises. Due to this, when a charging time becomes long, a difference between the magnet temperature of the first drive motor M1 and the magnet temperature of the second drive motor M2 becomes large. FIG. 3A shows how the electric vehicle 1 moves straight ahead when the magnet temperature difference is larger than the allowable magnet temperature difference, and FIG. 3B shows how the electric vehicle 1 moves straight ahead when the magnet temperature difference is within the allowable magnet temperature difference. When the magnet temperature difference is larger than the allowable magnet temperature difference, a difference between the torque outputted by the first drive motor M1 and the torque outputted by the second drive motor M2 becomes large, and this results in pulls toward one side that occur while driving in a straight line (see FIG. 3A). The allowable magnet temperature is set as the magnet temperature difference that causes the maximum allowable pull when the electric vehicle 1 moves straight ahead.

The motor controller 5 estimates a charge completion time from a SOC estimated value and a charged current value of the battery pack 2 (step S3). The charge completion time is a time duration required for the battery to complete charging. Next, the motor controller 5 estimates a time required for the difference between the estimated value of the magnet temperature of the first drive motor M1 and the estimated value of the magnet temperature of the second drive motor M2 to become equal to or less than the allowable magnet temperature difference when the second drive motor M2 magnet is heated by energizing the second drive motor M2 with the specified d-axis current, that is, a temperature-rise completion time for the second drive motor M2 (step S4). The temperature-rise completion time may be calculated as a sum of a time required for the difference in the estimated values of the magnet temperatures to match the allowable magnet temperature difference and a predetermined additional time.

Motor controller 5 determines whether or not the charge completion time estimated in step S3 is equal to or less than the temperature-rise completion time estimated in step S4 (step S5). If the charge completion time is longer than the temperature rise completion time, the process ends. The process then returns to step S1 and loop processing is performed. When the charge completion time becomes equal to or less than the temperature rise completion time, the process proceeds to step S6.

The motor controller 5 generates the second control signal PWM2 based on the d-axis current command value and electrically energizes the second drive motor M2 with the specified d-axis current. Since only the d-axis current flows in the second drive motor M2, the second drive motor M2 does not output torque. Further, since the charging completion time and the temperature rise completion time are matched to be the same in step S5, charging and temperature rise are completed at almost the same time. Therefore, when charging is completed, the difference between the estimated value of the magnet temperature of the first drive motor M1 and the estimated value of the magnet temperature of the second drive motor M2 becomes equal to or less than the allowable magnet temperature difference. Due to this, when the user starts driving the electric vehicle 1 immediately after charging and tries to drive the electric vehicle 1 straight ahead, the difference between the torque outputted by the first drive motor M1 and the torque outputted by the second drive motor M2 is sufficiently small. Thus, stable driving is thereby enabled (see FIG. 3B).

Effects

In the drive motor warm-up process shown in FIG. 2, the warm-up of the second drive motor M2 is completed simultaneously with the completion of charging. Due to this, the difference in the estimated values of the magnet temperatures can be kept within the allowable magnet temperature difference at the time of charge completion while suppressing power consumption. If necessary, the second drive motor M2 may be warmed up at an appropriate timing during the charging when the difference in the estimated values of the magnet temperatures becomes equal to or greater than the allowable magnet temperature difference.

In the warm-up process shown in FIG. 2, during the period in which the charging switch is in an on-state (i.e., during the charging process), if the temperature difference between the estimated value of the magnet temperature of the first drive motor M1 and the estimated value of the magnet temperature of the second drive motor M2 is equal to or greater than the allowable magnet temperature difference (S2: Y), an electrically energizing process in step S6 can be executed. This means, for example, that when the temperature difference between the first drive motor M1 and the second drive motor M2 is small, control can be executed so that the electrically energizing process of step S6 is left unexecuted. Thus, the warm-up process can be executed in an energy-efficient manner.

Using step S2 in FIG. 2, the temperature difference between the estimated value of the magnet temperature of the first drive motor M1 and the estimated value of the magnet temperature of the second drive motor M2 can be monitored during the period in which the charging switch is in the on-state (i.e., during the charging process). Further, in response to the temperature difference becoming equal to or greater than the allowable magnet temperature difference, the processes of estimating the charge completion time (S3) and the heat-up completion time (S4) can be executed. Due to this, for example, the processing of steps S3 and S4 can be controlled so as not to be executed when the temperature difference between the first drive motor M1 and the second drive motor M2 is small. Burden on the motor controller 5 can be reduced.

Second Embodiment

Figure 4:
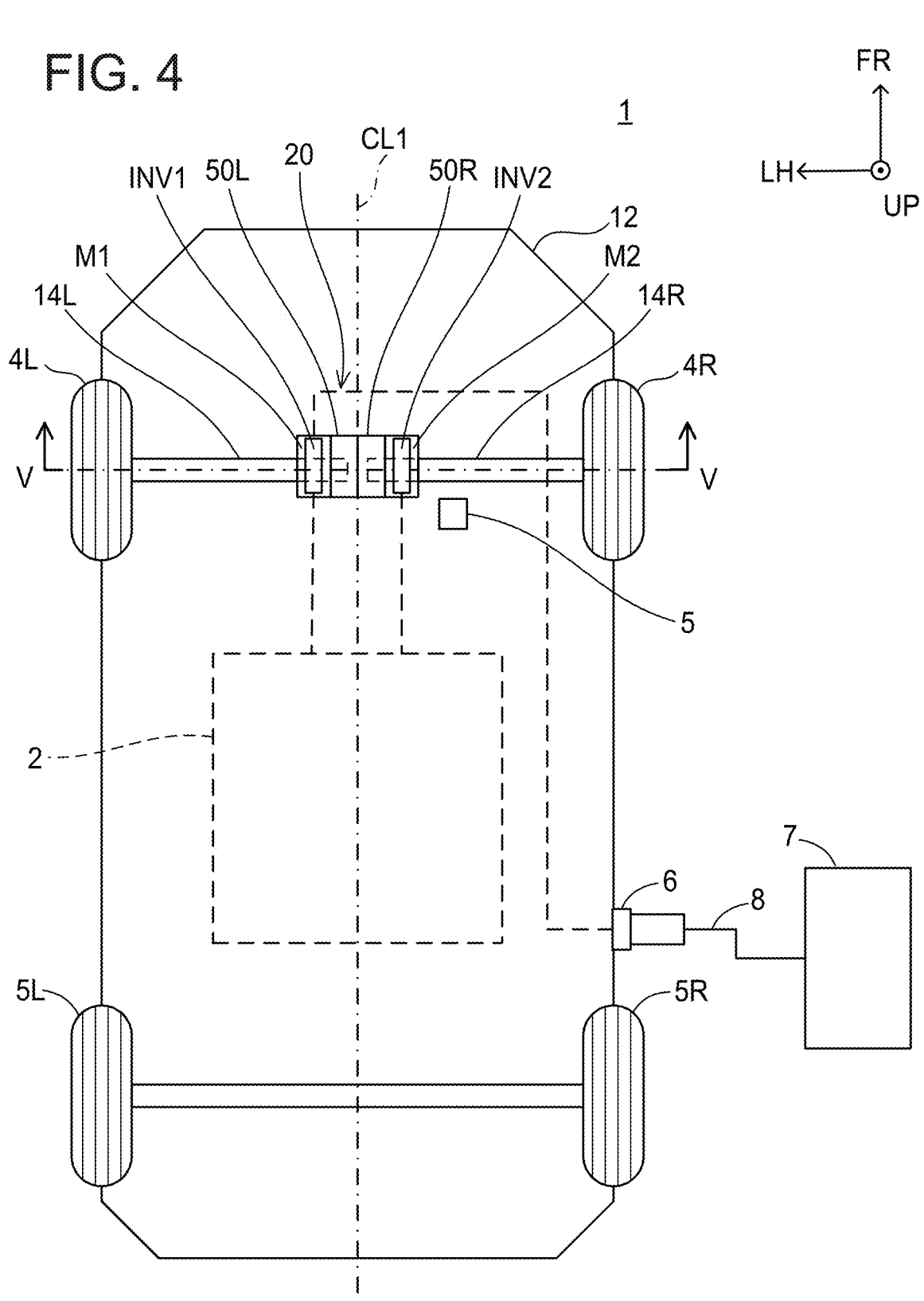
FIG. 4 is a diagram seeing an electric vehicle 1 from above.

A second embodiment is a specific configurational example of the contents described in the first embodiment. FIG. 4 is a diagram of the electric vehicle 1 comprising a drive device 20 viewed from above. In FIG. 4, a frontward direction of the electric vehicle 1 is shown as "FR," a leftward direction as "LH," and an up direction as "UP. The same applies to the subsequent drawings.

In addition to the drive device 20, the electric vehicle 1 is also equipped with a vehicle body 12, the battery pack 2, a pair of front wheels 4L, 4R on left and right sides, a pair of rear wheels 5L, 5R on left and right sides, and a charging inlet 6. The drive device 20 comprises the first drive motor M1, the second drive motor M2, the first inverter INV1, the second inverter INV2, a first power transmission mechanism 50L, and a second power transmission mechanism 50R.

The drive device 20 drives the pair of front wheels 4L, 4R by supplying electric power from the battery pack 2 to the first drive motor M1 and the second drive motor M2. Due to this, the electric vehicle 1 is driven. That is the pair of front wheels 4L, 4R is the drive wheels of the electric vehicle 1. In a variant, the pair of rear wheels 5L, 5R may be the drive wheels of the electric vehicle 1.

The first drive motor M1 and the second drive motor M2 are arranged symmetrically with respect to a center line CL1 in a left-right direction of the electric vehicle 1, and have the same structure as each other. The first drive motor M1 is located to the left of the center line CL1, and the second drive motor M2 is located to the right of the center line CL1. The first inverter INV1 is located above the first drive motor M1 and the second inverter INV2 is located above the second drive motor M2. The first drive motor M1 and the first inverter INV1 are electrically connected to each other, and the second drive motor M2 and the second inverter INV2 are electrically connected to each other. The first power transmission mechanism 50L and the second power transmission mechanism 50R are mechanically connected to the first drive motor M1 and the second drive motor M2, respectively.

The charging inlet 6 is located on a right side surface of the vehicle body 12. The charging inlet 6 is configured to be connected to the external DC power supply 7 (e.g., a charging station) via a power cable 8.

Figure 5:
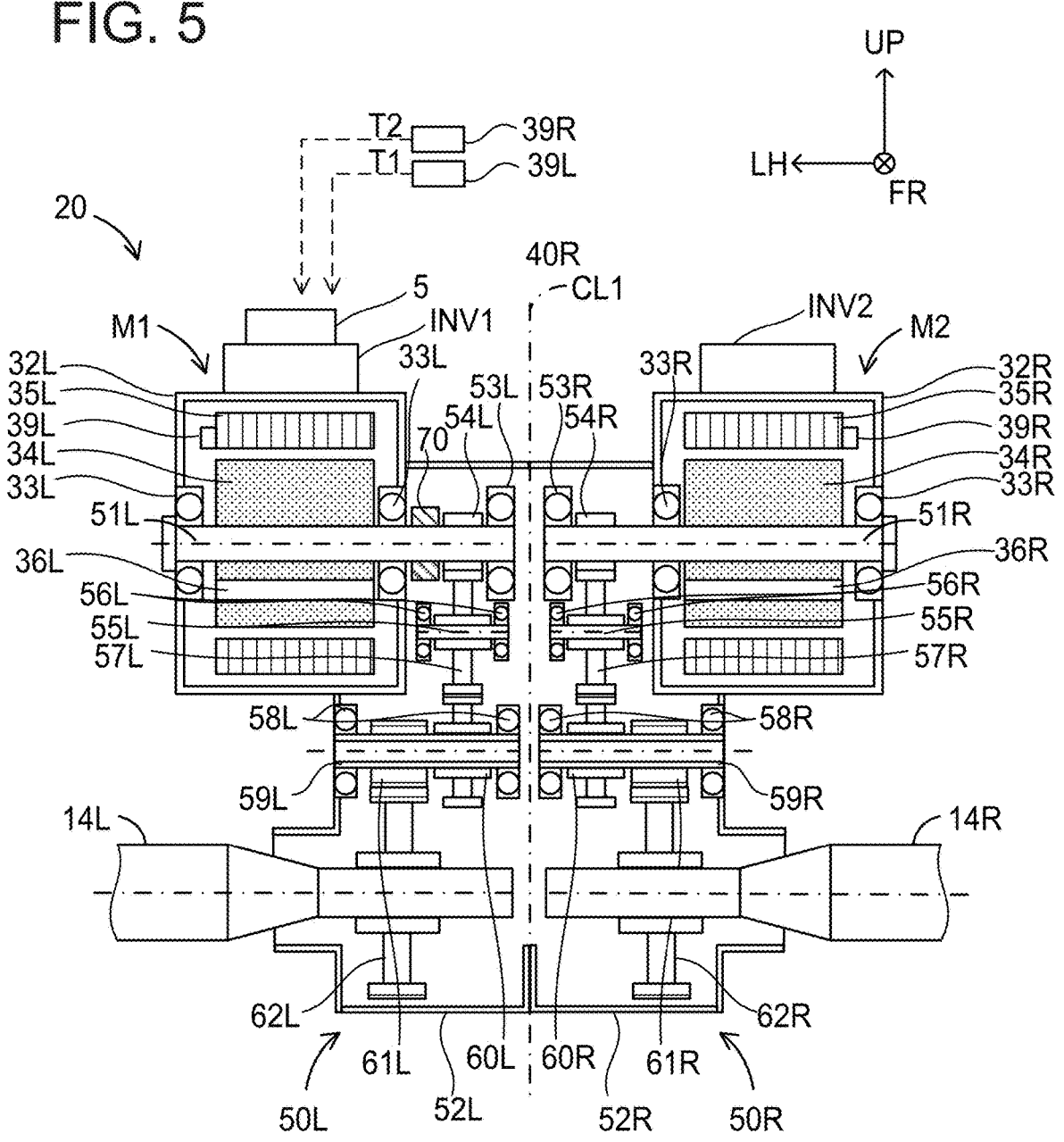
FIG. 5 is a cross-sectional view along a line V-V in FIG. 4.

The detailed structure of the drive device 20 is described with reference to FIG. 5. FIG. 5 is a cross-sectional view along a line V-V of FIG. 4. In addition to the first drive motor M1, the second drive motor M2, etc. as described above, the drive device 20 further comprises the motor controller 5.

The first drive motor M1 of the drive device 20 comprises a first motor casing 32L, a first motor bearing 33L, a first rotor 34L, a first stator 35L, and the first temperature sensor 39L. The first motor casing 32L houses the first rotor 34L, the first stator 35L, and the first temperature sensor 39L. The first rotor 34L includes first permanent magnets 36L. The first stator 35L faces the first rotor 34L from a radially outer side. An outer circumference of the first stator 35L is covered by a U-phase coil 35U, a V-phase coil 35V, and a W-phase coil 35W (see FIG. 1). The first temperature sensor 39L is fixed to a left end surface of the first stator 35L. The first temperature sensor 39L detects the motor temperature T1 of the first drive motor M1 and transmits the same to the motor controller 5. In a variant, the first temperature sensor 39L may be fixed to an inner wall of the first motor casing 32L, for example. The first motor bearing 33L is, for example, a ball bearing. The first motor bearing 33L rotates the first motor shaft 51L by rolling balls along an inner race.

As aforementioned, the second drive motor M2 has the same configuration as the first drive motor M1. Due to this, similar to the first drive motor M1, the second drive motor M2 comprises a second motor casing 32R, a second motor bearing 33R, a second rotor 34R including second permanent magnets 36R, a second stator 35R, and the second temperature sensor 39R. The second motor bearing 33R rotates the second motor shaft 51R. The second temperature sensor 39R detects the motor temperature T2 of the second drive motor M2 and transmits the same to the motor controller 5.

The first power transmission mechanism 50L transmits the torque of the first drive motor M1 to the first drive shaft 14L. The first drive shaft 14L is connected to the front wheel 4L. The first power transmission mechanism 50L has a plurality of bearings 53L, 56L, 58L, a plurality of gears 54L, 57L, 60L, 61L, 62L, and a plurality of shafts 55L, 59L. The first power transmission mechanism 50L, for example, uses the plurality of gears 54L, 57L, 60L, 61L, 62L, etc. to drive the first drive shaft 14L by reducing rotary speed from the first drive motor M1. Further, the first power transmission mechanism 50L further comprises a parking gear 70.

The second power transmission mechanism 50R transmits the power of the second drive motor M2 to the second drive shaft 14R. The second power transmission mechanism 50R has a symmetrical structure to the first power transmission mechanism 50L as described above. Due to this, the second power transmission mechanism 50R comprises a plurality of bearings 53R, 56R, 58R, a plurality of gears 54R, 57R, 60R, 61R, 62R, and a plurality of shafts 55R, 59R.

The second power transmission mechanism 50R, for example, utilizes the plurality of gears 54R, 57R, 60R, 61R, 62R to reduce rotary speed from the second drive motor M2 and rotate the second drive shaft 14R.

Third Embodiment

Figure 6:
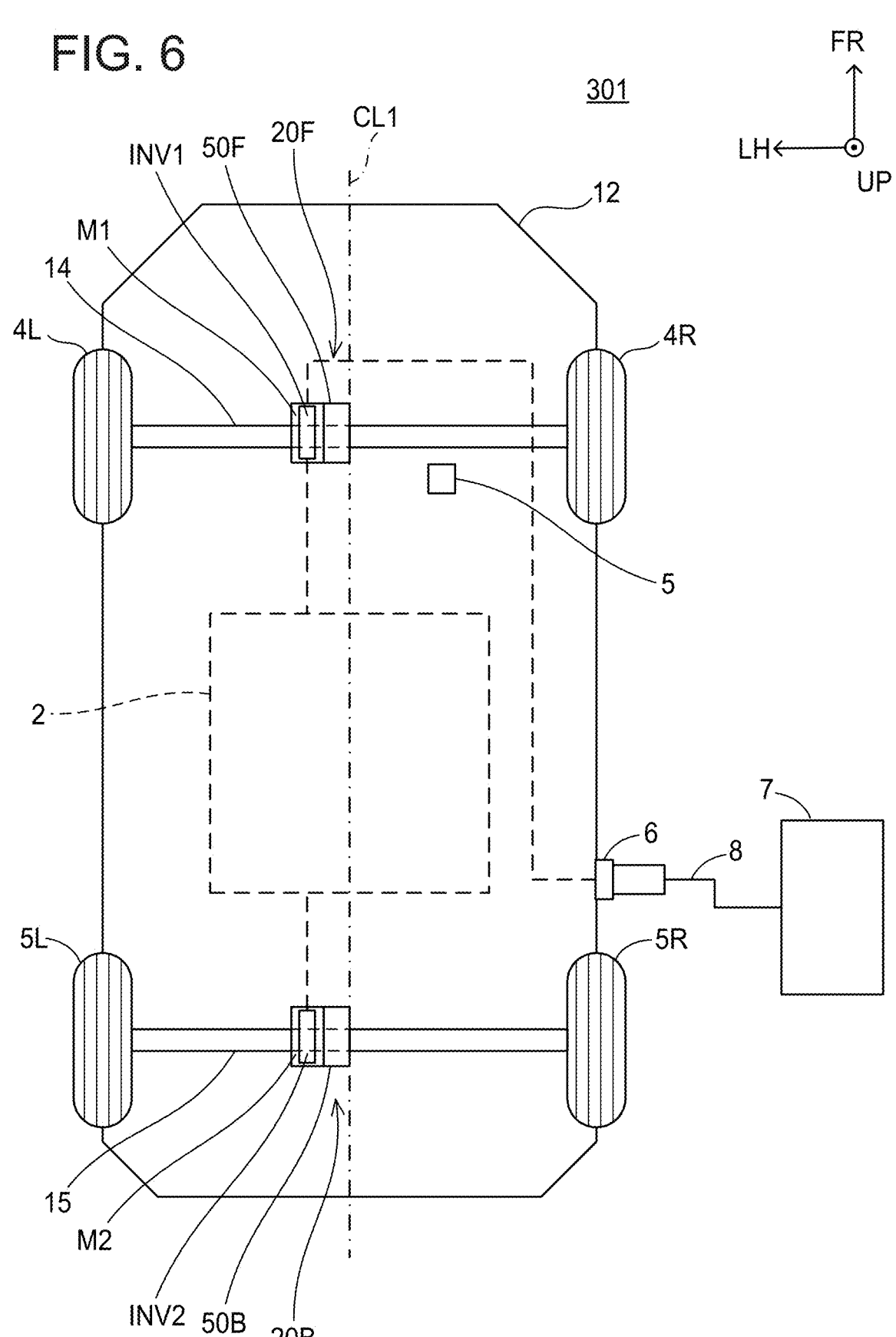
FIG. 6 is a diagram seeing an electric vehicle 301 from above.

A third embodiment differs from the second embodiment in regard to driving wheels that are driven by the first drive motor M1 and the second drive motor M2. The common configurations shared between the third and first embodiments are given the same reference signs, and the explanation thereof is omitted. FIG. 6 shows a diagram of an electric vehicle 301 of the third embodiment. FIG. 6 is a drawing corresponding to FIG. 4.

A drive device 20F comprises a first drive motor M1, a first inverter INV1, and a first power transmission mechanism 50F. The first power transmission mechanism 50F transmits torque of the first drive motor M1 to front wheels 4L and 4R via a first drive shaft 14.

A drive device 20B comprises a second drive motor M2, a second inverter INV2, and a second power transmission mechanism 50B. The second power transmission mechanism 50B transmits torque of the second drive motor M2 to rear wheels 5L and 5R via a second drive shaft 15.

Since the warm-up process described in FIG. 2 can be executed for the electric vehicle 301 of the third embodiment, the same effect as that of the electric vehicle 1 in the first embodiment can be obtained.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

Variants

In the process of electrically energizing the d-axis current (step S6), the motor controller 5 may control a magnitude of the d-axis current energizing the second drive motor M2 in accordance with the temperature difference calculated in step S2. For example, a larger value may be set as the d-axis current when the temperature difference is larger. In this case, the value of the d-axis current may be proportional to the temperature difference. As a specific example, the temperature difference may be multiplied by a predetermined conversion value to calculate the value of d-axis current. This enables an increase in an amount of heat generated by the second drive motor M2, because a larger value can be set as the d-axis current with larger the temperature difference. Thus, the warm-up process can be executed in an energy-efficient manner.

What is claimed is:

1. A drive device for an electric vehicle equipped with a battery, the drive device comprising:

a first motor and a second motor electrically connected to the battery and configured to drive at least one driving wheel of the electric vehicle; and a controller configured to respectively control a current that flows in the first motor and a current that flows in the second motor, wherein the controller is configured to execute:

supplying power from an external power supply to the battery via a neutral point of the first motor;

causing a d-axis current to flow in the second motor during the supplying the power;

estimating a required charging time required for completing to charge the battery in the supplying the power; and estimating a required temperature rising time required for a temperature difference between the first motor and the second motor to become equal to or less than a predetermined value in the causing the d-axis current to flow in the second motor, and wherein the controller starts the causing the d-axis current to flow in the second motor in response to the required charging time having decreased to the required temperature rising time or less.

2. The drive device according to claim 1, wherein the controller executes the causing the d-axis current to flow in the second motor during the supplying the power when a temperature difference between the first motor and the second motor is equal to or greater than a predetermined value.

3. The drive device according to claim 2, wherein the temperature difference is a difference between a magnet temperature of a rotor of the first motor and a magnet temperature of a rotor of the second motor.

4. The drive device according to claim 1, wherein the controller controls a magnitude of the d-axis current that flows in the second motor in accordance with a temperature difference between the first motor and the second motor.

5. The drive device according to claim 1, wherein the controller is configured to execute:

monitoring the temperature difference during the supplying the power, and the estimating the required charging time and the estimating the required temperature rising time when the temperature difference becomes equal to or greater than the predetermined value.

6. The drive device according to claim 1, wherein the at least one driving wheel comprises a left wheel and a right wheel of the electric vehicle, and the first motor drives one of the left wheel and the right wheel, and the second motor drives the other of the left wheel and the right wheel.

7. The drive device according to claim 1, wherein the at least one driving wheel comprises a front wheel and a rear wheel of the electric vehicle, and the first motor drives one of the front wheel and the rear wheel, and the second motor drives the other of the front wheel and the rear wheel.

8. The drive device according to claim 1, further comprising:

an inverter circuit that comprises a plurality of switching elements and that is electrically connected between the battery and the first motor, wherein the controller controls the plurality of switching elements during the supplying the power and causes the inverter circuit to cooperate with a plurality of coils of the first motor so as to function as a booster circuit.

* * * * *